WALTER FUCHS
INVENTOR.

BY Karl G. Ross

ATTORNEY

United States Patent Office 3,454,183
Patented July 8, 1969

3,454,183
CAP FOR LIQUID RESERVOIRS, ESPECIALLY BRAKE FLUID RESERVOIRS OF MASTER CYLINDERS
Walter Fuchs, Bad Homburg vor der Hohe, Germany, assignor to Alfred Teves GmbH., Bad Homburg vor der Hohe, Germany, a corporation of Germany
Filed Feb. 6, 1968, Ser. No. 703,419
Claims priority, application Germany, Feb. 7, 1967, T 33,162
Int. Cl. B65d 41/04, 51/16
U.S. Cl. 220—44                    7 Claims

ABSTRACT OF THE DISCLOSURE

A closure for the fluid reservoir, i.e., the master-cylinder brake fluid reservoir of a vehicle brake system wherein pressure equalization is permitted between the exterior and interior of the reservoir via a cap whose screw-type cover has an inwardly extending cylindrical projection or boss defining, with a cup-shaped upwardly open member, a cap compartment spanned by a disk having at least one opening offset from openings provided in the floor of the cup which is integrally molded with pins retaining the disk against the cylindrical boss of the cover member, the latter being perforated to communicate between the cap chamber and the external atmosphere.

My present invention relates to a closure arrangement for fluid reservoirs in which pressure equalization without escape of liquid and without material introduction of moist air into the reservoir is desired and, more particularly, to a cap for the brake-fluid reservoir of a master cylinder.

In hydraulic brake systems, it is common practice, especially in automotive vehicles, to provide a master cylinder whose piston displaces brake fluid via one or more brake lines to respective wheel-brake cylinders of internal-expansion or disk-type brakes. The master cylinder is surmounted by a brake-fluid reservoir holding a quantity of brake fluid in excess of that normally required for proper functioning of the brake and connected with the working chamber of the cylinder by an intake port (generally opening behind the primary cup of the pedal-operated piston) and a bypass port which is closed upon advance of the forward end of this piston. The reservoir or supply tank is commonly provided with a filler cap which forms a vent connecting the gas space above the liquid surface in the reservoir with the external atmosphere thereby permitting pressure equalization across the cap and limiting introduction of moist air into the supply tank or mechanical displacement of brake fluid from the latter. Most of the filler caps hitherto provided for this purpose are highly complex with complicated and expensive valve structures and a propensity toward blockage or malfunction.

It is the principal object of the present invention to provide an improved filler cap of the character described which is of inexpensive and relatively simple construction but yet provides assurance against loss of brake fluid. Still another object of this invention is to provide an improved filler cap for the reservoir or supply tanks of a hydraulic master cylinder which is of simple construction and allows pressure equalization between the interior and exterior of the reservoir while effectively barring escape of fluid from the tank.

These objects are obtainable, in accordance with the present invention, by forming the cap with a screw-type closure or cover having internal or external threads adapted to mate with the threads of the neck of the supply tank or forming a bayonet-coupling therewith, the cover member having a cylindrical boss surrounding an orifice in the cover open to the exterior, this cylindrical boss being coaxial and concentric with the rim or apron of the cover. The central boss is engaged by an upwardly open cup defining within the boss a cap compartment open to the atmosphere via an orifice and to the interior of the reservoir or tank by a perforation or plurality of perforations formed in the base of the cup. Within this compartment of the cap, I prefer to provide a perforated disk whose aperture is offset laterally of the perforations in the base of the cup, i.e. whose aperture does not register with the perforations, the disk being retained against the downwardly extending edge of the boss by a multiplicity of pins upstanding from the base of the cup and bearing against the apertured disk. The aperture of the disk may be disposed along the axis of the cap, i.e., centrally of the radially offset, angularly spaced perforations to provide a labyrinth-type seal which serves as well to form baffles of impingement or direct-change type to precipitate and drain droplets from the air stream force through the cap during brake operation for pressure equalization.

The cup and the cylindrical boss may be provided with interfitting male and female formations, e.g., a ridge-and-groove connection, mating threads or a bayonet coupling, to allow the cup to be mounted on the cylindrical boss. Preferably, the cup receives the boss and engages the outer surface thereof.

The above and other objects, features and advantages of the present invention will become more readily apparent from the following description, reference being made to the accompanying drawing in which.

Figure 1:
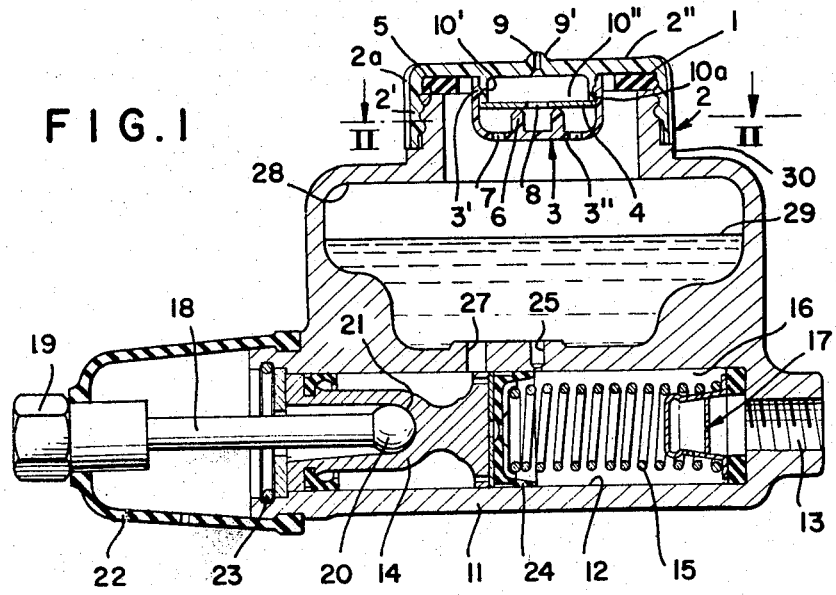
FIG. 1 is an axial cross-sectional view of a brake master cylinder provided with a filler gap in accordance with the present invention.

In FIG. 1, I show a brake master cylinder 11 which comprises a cylinder bore 12 having an outlet 13 at one axial end thereof, the outlet being connected via the usual brake lines with the wheel brake cylinder. Within the cylinder bore 12, a piston 14 is axially shiftable against the force of a return spring 15 to drive fluid from the working compartment 16 past a check valve 17 to the outlet 13. The check valve 17 maintains a predetermined brake pressure in the fluid lines while allowing return of excess fluid when the brake is released. A link 18, connectable at 19 with the brake pedal, has a spherical head 20 received in a socket 21 of the piston. A dust-excluding boot 22 surrounds the link 18. The piston, which is engageable with a stop ring 23 in its left-hand extreme position, has a primary cup 24, sealingly engaging the wall 12 of the cylinder and serving to close a bypass port 25 communicating between the supply tank or fluid reservoir 26 and the cylinder bore 12. An intake portion 27 connects the interior 28 of the tank 26, whose liquid level is represented at 29, with the cylinder 12 behind the primary cup 24. The supply tank 26 is formed at its upper side with a neck 30 onto which a cap is threaded.

The cap comprises a downwardly open cup-shaped cover member 2 whose apron 2' is molded integrally with thread ridges 5 complementarily engaging the ridges of the externally threaded neck 30 whose upper lip bears against a rubber washer 1 mounted against the disk-shaped top 2" of the cover member 2. The latter is milled at 2a to enable the user to grip the cover firmly. Coaxially with the apron 2', the cover 2 is molded integrally and unitarily with a cylindrical boss 10 through the center of which an outwardly converging orifice 9 extends, this orifice having a narrow bore surrounded by a bridge 9'. The cylindrical boss 10 which is formed along its outer surface with a groove 10' engageable by an inner bead 3' of a cup 3 fitted over this boss, defines a chamber 10" with the cup.

Figure 2:
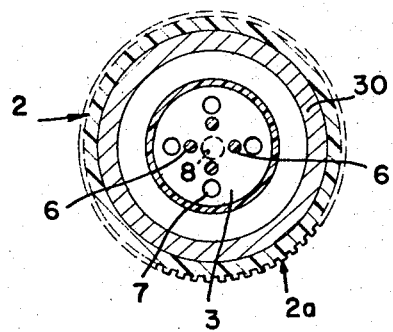
FIG. 2 is a view taken in the direction II of FIG. 1.
Figure 3:
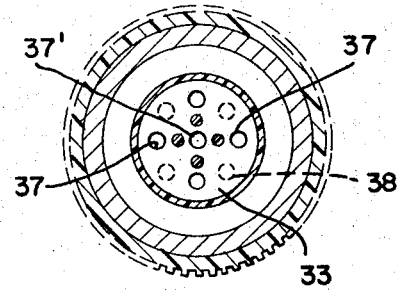
FIG. 3 is a view similar to FIG. 2 of another embodiment of the filler gap.

The cup 3, also molded from a synthetic resin, has a bottom portion 3" formed with a plurality of perforations 7 (see FIG. 2) angularly spaced about the axis of the cover and offset outwardly from a synthetic-resin disk 4 which is disposed centrally in the chamber 10". The disk 4, whose opening 8 is located along the axis of the cover (FIG. 2) is held against the rim 10a of the boss 10 via a plurality of upstanding pins 6 injection-molded unitarily with the cup 3. The radially offset arrangement of openings 7 and 8 provides a labyrinth passage for the gas, thereby stripping entrained droplets therefrom and preventing escape of the brake liquid. A pressure equalization between the chamber 28 and the exterior of the vessel is, however, permitted. It is also possible to provide a single bore in the base 3" of the cup 3 at a central location and a multiplicity of angularly equispaced openings radially outwardly of the central opening of the cup. Another modification is shown in FIG. 3 wherein the cup bottom 33 is formed with a plurality of angularly equispaced openings 37 and a central opening 37'. The pins are represented at 36 while the openings of the disk are angularly equispaced at 38 about the opening 37' and are radially offset outwardly therefrom. In addition, the openings 38 are angularly offset from the openings 37.

I claim:

1. A closure for a liquid reservoir permitting pressure equalization thereacross, said closure comprising:
   a cover member removably mounted on said reservoir and sealingly engaging same;
   a cylindrical boss formed on said cover member and projecting inwardly into said reservoir, said cover member being provided with an orifice surrounded by said boss and communicating between said reservoir and the exterior; and an upwardly open cup engaging said boss and defining therewith a closure chamber, said cup being formed with at least one perforation connecting the interior of said reservoir with said chamber; and
   a disk spanning said chamber and formed with at least one opening offset radially from said perforation; said cup engaging an outer surface of said disk and at least partly enclosing same, said disk being retained by said cup against said boss, said cup having a base provided with at least one upstanding pin formed unitarily with said cup retaining said disk against said boss at a location offset from the wall of the latter.

2. A closure as defined in claim 1 wherein said opening in said disk is located centrally of said boss and said perforation of said cup is one of a plurality of perforations formed therein and angularly spaced around said opening.

3. A closure as defined in claim 2 wherein said cup is formed with a plurality of upstanding pins retaining said disk in said chamber.

4. A closure as defined in claim 1 wherein said cover member is formed with a downwardly extending apron threadedly engaging a neck of said reservoir.

5. A closure as defined in claim 1, further comprising releasable coupling means connecting said cup to said boss.

6. A closure as defined in claim 1 wherein said orifice converges outwardly from said chamber.

7. A closure as defined in claim 1, further comprising to said disk is located centrally of said boss and said reservoir.

References Cited

UNITED STATES PATENTS

| 2,675,093 | 4/1954 | McCall. |
| 3,199,716 | 8/1965 | Price. |

FOREIGN PATENTS

| 1,252,543 | 12/1960 | France. |
| 958,535 | 2/1957 | Germany. |
| 465,664 | 9/1951 | Italy. |

GEORGE E. LOWRANCE, *Primary Examiner.*